(12) United States Patent
Kataoka et al.

(10) Patent No.: US 9,130,273 B2
(45) Date of Patent: Sep. 8, 2015

(54) COMMUNICATION APPARATUS

(71) Applicant: KABUSHIKI KAISHA TOSHIBA, Minato-ku, Tokyo (JP)

(72) Inventors: Kazuki Kataoka, Kanagawa-ken (JP); Takafumi Ohishi, Kanagawa-ken (JP); Kazuhiro Inoue, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 314 days.

(21) Appl. No.: 13/754,403

(22) Filed: Jan. 30, 2013

(65) Prior Publication Data

US 2013/0278470 A1  Oct. 24, 2013

(30) Foreign Application Priority Data

Apr. 18, 2012 (JP) ................. 2012-094539

(51) Int. Cl.
| | |
|---|---|
| *H01Q 7/00* | (2006.01) |
| *H04B 13/00* | (2006.01) |
| *H01Q 1/27* | (2006.01) |
| *H01Q 7/06* | (2006.01) |
| *H04B 5/00* | (2006.01) |
| *H01Q 7/08* | (2006.01) |

(52) U.S. Cl.
CPC ................. *H01Q 1/273* (2013.01); *H01Q 7/00* (2013.01); *H01Q 7/06* (2013.01); *H01Q 7/08* (2013.01); *H04B 5/00* (2013.01); *H04B 13/005* (2013.01)

(58) Field of Classification Search
CPC ........... H01Q 1/273; H01Q 7/06; H01Q 7/08; H04B 5/00; H04B 13/00; H04B 13/005

USPC ................... 343/718, 725, 787; 455/41.1
See application file for complete search history.

(56) References Cited

U.S. PATENT DOCUMENTS 5,567,537 A * 10/1996 Yoshizawa et al. ........... 428/800
6,223,018 B1 * 4/2001 Fukumoto et al. ........... 455/41.1
(Continued)

FOREIGN PATENT DOCUMENTS

| JP | 10-229357 A | 8/1998 |
|---|---|---|
| JP | 2001-007735 A | 1/2001 |

(Continued)

OTHER PUBLICATIONS

Japanese Office Action (and English translation thereof) dated May 8, 2015, issued in counterpart Japanese Application No. 2012-094539.

*Primary Examiner* — Dameon E Levi
*Assistant Examiner* — Jennifer F Hu
(74) *Attorney, Agent, or Firm* — Holtz, Holtz, Goodman & Chick PC

(57) ABSTRACT

According to an embodiment, a communication apparatus communicates through a living body. One end of a first signal line is connected to the communication unit. A terminal is connected to the other end of the first signal line. One end of a second signal line is connected to the terminal. The second signal line is connected to the first signal line through the terminal. A first signal electrode is connected to the other end of the second signal line. One end of a third signal line is connected to the terminal. The third signal line is connected to the first signal line through the terminal. One end of a magnetic field sensor is connected to the other end of the third signal line. The other end of the magnetic field sensor is connected to a reference potential electrode.

18 Claims, 16 Drawing Sheets

(56) References Cited

U.S. PATENT DOCUMENTS

| | | | |
|---|---|---|---|
| 6,538,617 B2* | 3/2003 | Rochelle | 343/788 |
| 8,340,575 B2 | 12/2012 | Kato | |
| 8,588,684 B2* | 11/2013 | Mori et al. | 455/41.1 |
| 8,594,564 B2* | 11/2013 | Kurata et al. | 455/41.1 |
| 8,847,827 B2* | 9/2014 | Ohishi et al. | 343/702 |
| 8,862,191 B2* | 10/2014 | Ohishi | 455/575.7 |
| 8,928,539 B2* | 1/2015 | Onaka et al. | 343/728 |
| 9,014,629 B2* | 4/2015 | Kurata et al. | 455/41.1 |
| 9,014,630 B2* | 4/2015 | Mori et al. | 455/41.1 |
| 2003/0090429 A1* | 5/2003 | Masudaya et al. | 343/788 |
| 2008/0278392 A1* | 11/2008 | Chu et al. | 343/745 |
| 2009/0009406 A1* | 1/2009 | Chu et al. | 343/702 |
| 2009/0284423 A1* | 11/2009 | Yi et al. | 343/702 |
| 2009/0309699 A1* | 12/2009 | Pollabauer | 340/5.64 |
| 2010/0304671 A1* | 12/2010 | Hebiguchi et al. | 455/41.1 |
| 2012/0007787 A1* | 1/2012 | Schantz et al. | 343/788 |
| 2012/0025939 A1* | 2/2012 | Yamaguchi et al. | 336/105 |
| 2012/0081257 A1* | 4/2012 | Yosui et al. | 343/788 |
| 2012/0098724 A1* | 4/2012 | Yosui et al. | 343/788 |
| 2012/0127042 A1* | 5/2012 | Ohishi et al. | 343/702 |
| 2012/0129449 A1* | 5/2012 | Kurata et al. | 455/41.1 |
| 2012/0178387 A1* | 7/2012 | Ohishi | 455/90.2 |
| 2013/0147427 A1* | 6/2013 | Polu et al. | 320/108 |
| 2013/0149961 A1* | 6/2013 | Mori et al. | 455/41.1 |
| 2013/0229319 A1* | 9/2013 | Miura et al. | 343/788 |
| 2013/0278470 A1* | 10/2013 | Kataoka et al. | 343/718 |
| 2014/0057554 A1* | 2/2014 | Mori et al. | 455/11.1 |
| 2014/0057562 A1* | 2/2014 | Kurata et al. | 455/41.1 |

FOREIGN PATENT DOCUMENTS

| | | |
|---|---|---|
| JP | 2003-037566 A | 2/2003 |
| JP | 4099484 B2 | 6/2008 |
| JP | 2008-263405 A | 10/2008 |
| JP | 2008288758 A | 11/2008 |
| JP | 2009-153045 A | 7/2009 |
| JP | 2009225312 A | 10/2009 |
| JP | 2010074605 A | 4/2010 |
| JP | 2010-177766 A | 8/2010 |
| JP | 2011-019103 A | 1/2011 |
| JP | 2011-223239 A | 11/2011 |
| WO | 2011033593 A1 | 3/2011 |

* cited by examiner

COMMUNICATION APPARATUS

CROSS REFERENCE TO RELATED APPLICATION

This application is based upon and claims the benefit of priority from the prior Japanese Patent Application No. 2012-094539, filed on Apr. 18, 2012, the entire contents of which are incorporated herein by reference.

FIELD

Embodiments described herein are related to a communication apparatus.

BACKGROUND

Living body communication transmits and receives communication data through living bodies including a human body. Such communication attracts attention. The living body communication is expected to be used in such fields as medical treatment/health care, short-distance radio, in-vehicle radio, and entertainment. The living body communication is capable of reducing power consumption more substantially than before.

Two electrodes are provided to a communication apparatus for the living body communication that uses a living body as a part of a transmission line. One of the two is a signal electrode connected to a signal line, and the other is a reference potential electrode connected to the earth potential of the communication apparatus having reference potential. Signal electrodes are connected to each other mainly through a living body. Reference potential electrodes connected to each other mainly through a space or the earth. Thereby, the communication apparatus transmits a potential difference between the signal electrode and the reference potential electrode.

Covering the communication apparatus with a housing is effective to enhance reliability of the communication apparatus that communicates through a living body. When signal electrodes are packed within the housing, a capacity coupling between a living body and a signal electrode is formed through the housing. Therefore, the communication apparatus results in lowering of the receiving sensitivity.

DETAILED DESCRIPTION

Figure 1:
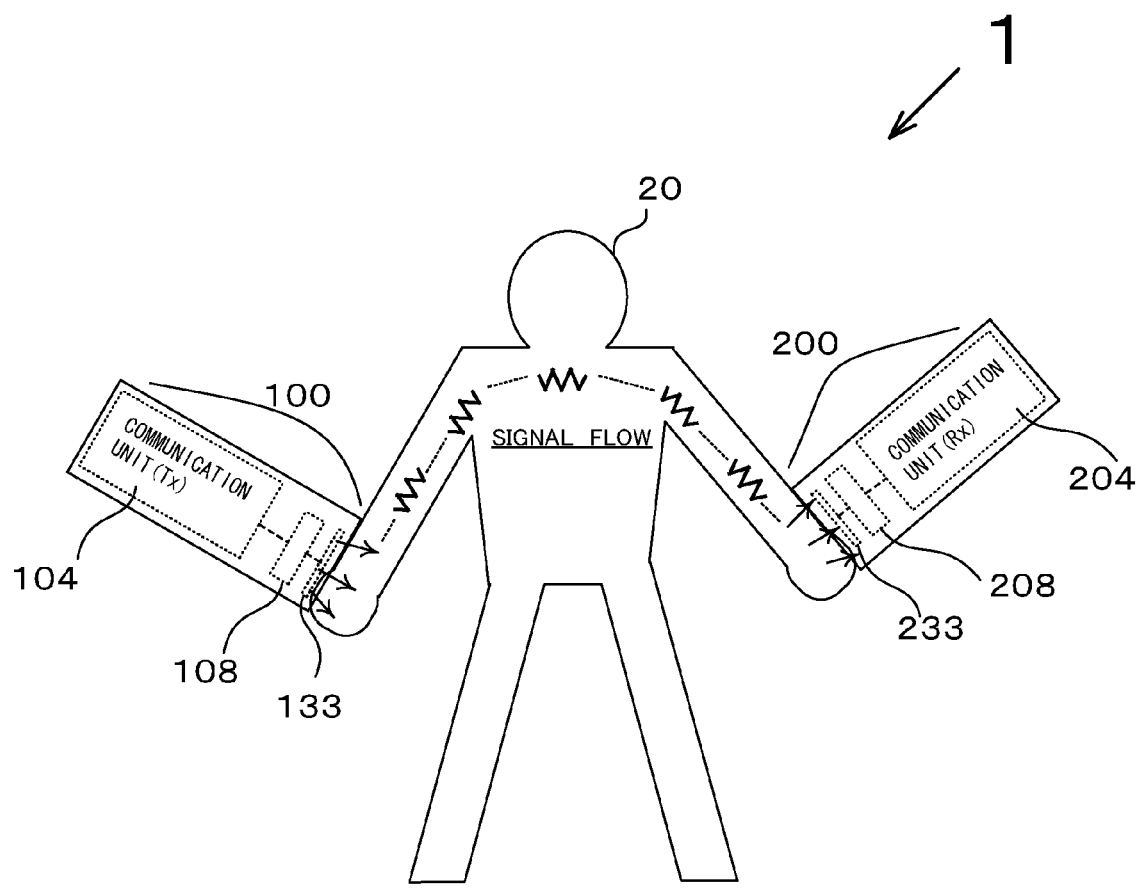
FIG. 1 is a view showing a configuration of a communication system according to a first embodiment.

According to an embodiment, a communication apparatus to communicate through a living body includes a substrate, a communication unit, a first signal line, a terminal, a second signal line, a first signal electrode, a third signal line, a magnetic field sensor, and a housing. The substrate includes a reference potential electrode. The communication unit is formed on a first main surface of the substrate. The first signal line is formed on the first main surface of the substrate. One end of the first signal line is connected to the communication unit. The terminal is formed on the first main surface and connected to the other end of the first signal line. The second signal line is formed on a side of the first main surface of the substrate. One end of the second signal line is connected to the terminal and connected to the first signal line through the terminal. The first signal electrode is formed on a side of the first main surface of the substrate, and connected to the other end of the second signal line. The third signal line is formed on a side of the first main surface of the substrate. One end of the third signal line is connected to the terminal and connected to the first signal line through the terminal. The magnetic field sensor is formed on the first main surface of the substrate. One end of the magnetic field sensor is connected to the other end of the third signal line. The other end of the magnetic field sensor is connected to the reference potential electrode. The housing covers and stores the substrate, the communication unit, the first signal line, the terminal, the second signal line, the first signal electrode, the third signal line, and the magnetic field sensor.

Hereinafter, further embodiments will be described with reference to the drawings. In the drawings, the same reference numerals denote the same or similar portions.

Figure 2:
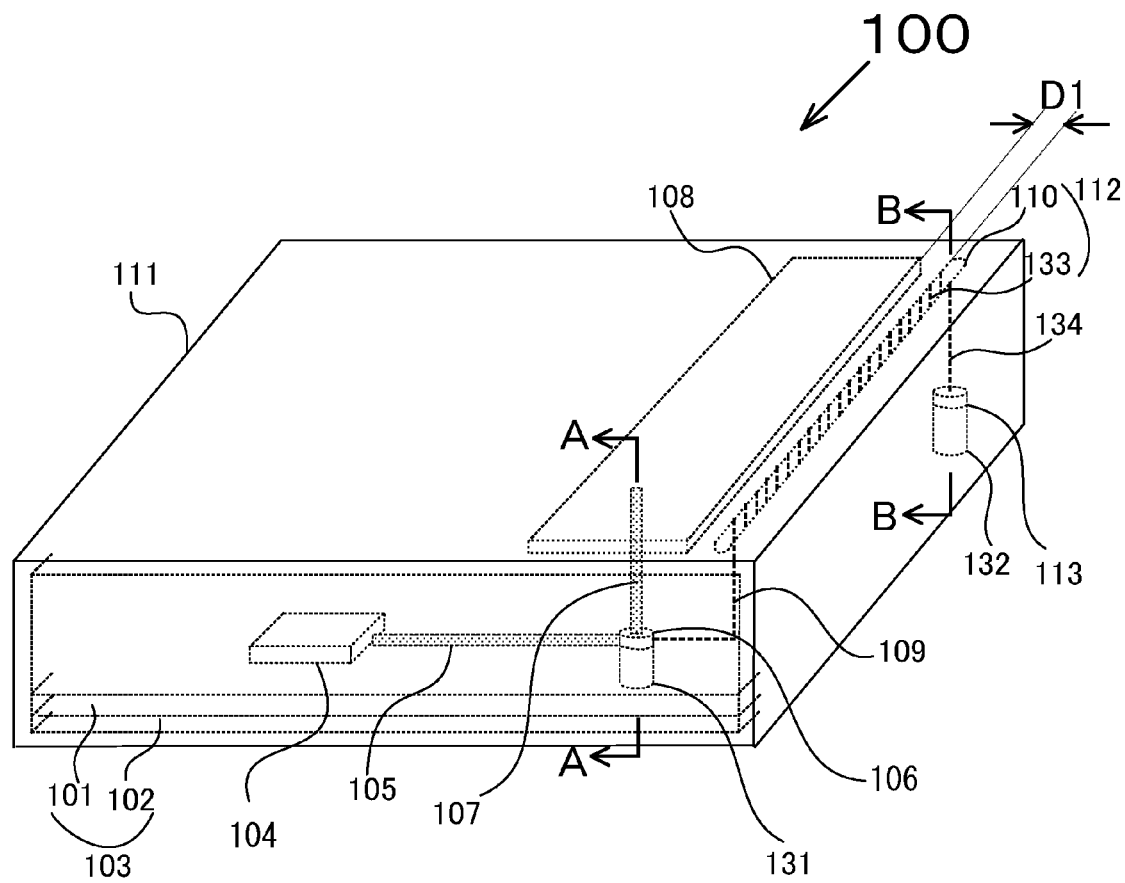
FIG. 2 is a view showing a configuration of a communication apparatus according to the first embodiment.
Figure 3:
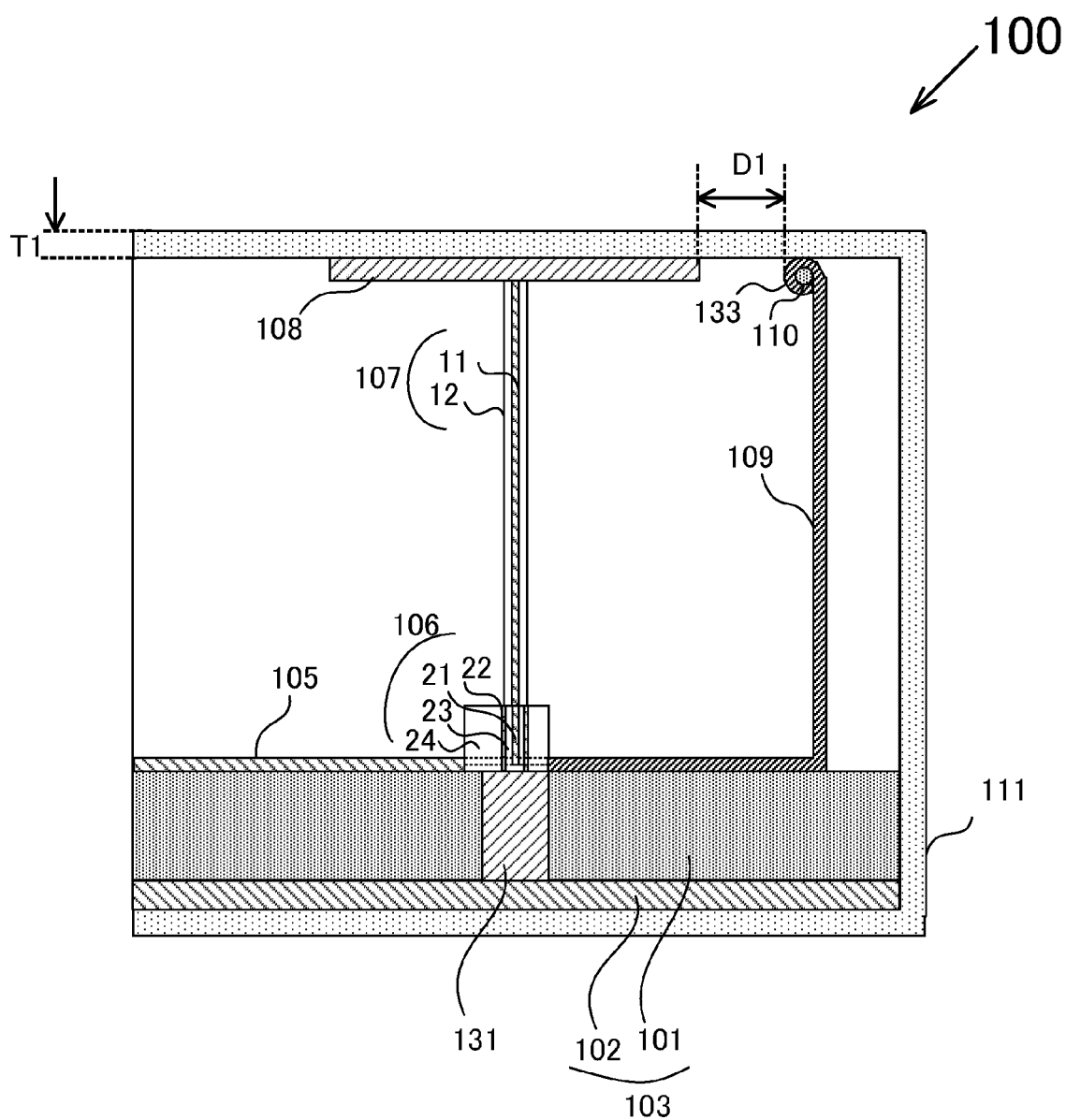
FIG. 3 is a sectional view taken along an A-A line in FIG. 2.
Figure 4:
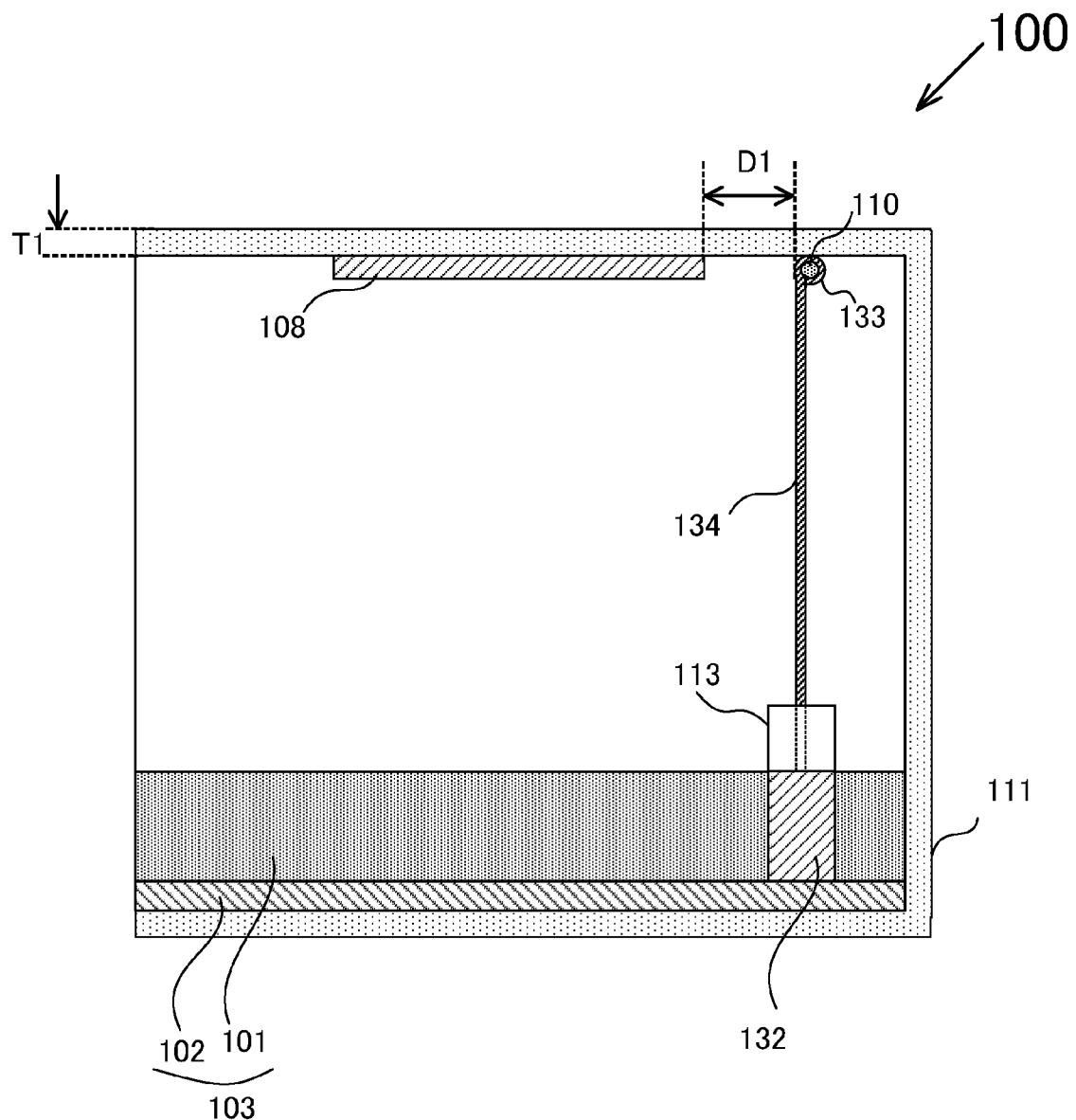
FIG. 4 is a sectional view taken along a B-B line in FIG. 2.

A communication apparatus according to a first embodiment will be described with reference to the drawings. FIG. 1 is a view showing a configuration of a communication system. FIG. 2 is a view showing a configuration of a communication apparatus. FIG. 3 is a sectional view taken along the A-A line in FIG. 2. FIG. 4 is a sectional view taken along the B-B line in FIG. 2. The embodiment employs variable capacitance, which varies with a distance between a signal electrode and a living body, as a frequency adjusting device. The embodiment enhances receiving sensitivity by setting an operating frequency of a magnetic field sensor to a carrier frequency of communication signals when the living body comes close.

As shown in FIG. 1, a communication apparatus 100 and a communication apparatus 200 are included in a communication system 1. The communication system 1 performs wearable computing communications between the communication apparatus 100 and the communication apparatus 200 through a living body 20 such as a human body or the like. The communication system 1 performs short-distance communications through the living body 20.

A communication unit 104 as a transmitter (Tx) of the communication apparatus 100 transmits data to a communication unit 204 as a receiver (Rx) of the communication apparatus 200 through a signal electrode 108, a coil 133, the living body 20, a coil 233, and a signal electrode 208. Meanwhile, the communication unit 204 as a transmitter (Tx) of the communication apparatus 200 transmits data to the communication unit 104 as a receiver (Rx) of the communication apparatus 100. The coil 133 and the coil 233, respectively, are wound around cores (not shown) to configure an antenna.

In addition, a human body (human being) is assumed as the living body 20 in FIG. 1, the living body 20 is not limited to a human body. Alternatively, the living body 20 may be an animal including a cat and a dog or the like.

As shown in FIG. 2, the communication apparatus 100 includes a substrate 103, the communication unit 104, a signal line 105, a terminal 106, a signal line 107, the signal electrode 108, a signal line 109, a housing 111, a magnetic field sensor 112, a terminal 113, a via 131, a via 132, and a signal line 134. Data communications are performed when the living body 20 comes close the signal electrode 108 and the magnetic field sensor 112 in the communication apparatus 100 and when the living body 20 comes close the signal electrode 208 and a magnetic field sensor in the communication apparatus 200.

The substrate 103 includes a dielectric portion 101 and a reference potential electrode 102. The reference potential electrode 102 is also referred to as an earth electrode. The dielectric portion 101 is formed on a first main surface of the reference potential electrode 102. The dielectric portion 101 includes insulating ceramics or an insulating organic material. The reference potential electrode 102 includes a metal layer, such as copper (Cu) or gold (Au), for example.

The communication unit 104 is formed on the first main surface of the dielectric portion 101 to transmit and receive data. The signal line 105 is formed on the first main surface of the dielectric portion 101, and connected to the communication unit 104 at one end of the signal line 105. The terminal 106 is formed on the first main surface of the dielectric portion 101, and is connected to the other end of the signal line 105. The ground of the communication unit 104 (not shown) is connected to the reference potential electrode 102 through a via.

The signal line 107 is formed on the side of the first main surface of the dielectric portion 101, and connected to the terminal 106 at one end of the signal line 107. The signal electrode 108 is formed on the signal line 107, and connected to the other end of the signal line 107. The signal electrode 108 is plate-like in form (when viewed from directly above in FIG. 2). The signal line 107 is perpendicular to the substrate 103. The terminal 106 is connected to the reference potential electrode 102 through the via 131. The signal line 109 is formed on the side of the first main surface of the dielectric portion 101, and connected to the terminal 106 at one end of the signal line 109.

The magnetic field sensor 112 generates a magnetic field on the surface of the living body 20 during propagation of signals. The magnetic field sensor 112 faces the signal electrode 108, and is separated from the signal electrode 108 by a distance of D1. The magnetic field sensor 112 is a bar antenna that is configured to wind a coil 133 around a rod-shaped core 110 including a high-permeability ferrite. In the magnetic field sensor 112, one end of the coil 133 is connected to the other end of the signal line 109, the other end of the coil 133 is connected to one end of the signal line 134. The other end of the signal line 134 is connected to the reference potential electrode 102 through the terminal 113 and the via 132.

The bar antenna is miniaturized to be insulated from the influence of near noises, and capable of responding to frequencies up to 200 MHz, for example.

The housing 111 is box-like in form. A lateral size of the housing 111 is larger than a vertical size of the housing 111. The housing 111 covers and stores the substrate 103, the communication unit 104, the signal line 105, the terminal 106, the signal line 107, the signal electrode 108, the signal line 109, the magnetic field sensor 112, the terminal 113, the via 131, the via 132, and the signal line 134.

Transparent materials are used for the signal electrode 108. The materials include a conductive sheet of copper foil, a thin film of conductive ink that is prepared by ink-jet printing and sintering, and ITO (indium tin oxide) for example. The signal electrode 108 and the magnetic field sensor 112 are arranged in parallel to each other on a flat inner-side surface of the housing 111. Alternatively, the housing 111 may have an oval-sphere inner-side-surface to arrange the signal electrode 108 and the magnetic field sensor 112 on the oval-sphere surface of the housing 111. The housing 111 is a box. Alternatively, the housing 111 may be a box with a round edge or an oval sphere.

As shown in FIG. 3, the signal line 105 is formed on the dielectric portion 101. The terminal 106 includes an inner conductor portion 21, an outer conductor portion 22, a dielectric layer 23, and a dielectric layer 24. The inner conductor portion 21 is formed in the central part of the terminal 106. The dielectric layer 23 is formed around the inner conductor portion 21. The outer conductor portion 22 is formed around the inner conductor portion 21 through the dielectric layer 23. The dielectric layer 24 is formed around the outer conductor portion 22.

The signal line 107 includes an inner signal line 11 and a dielectric layer 12. The inner signal line 11 is formed in the central part of the signal line 107. The dielectric layer 12 is formed around the inner signal line 11. The inner signal line 11 of the signal line 107 is connected to the signal line 105 at one end of the inner signal line 11, and to the signal electrode 108 at the other end of the inner signal line 11. The signal electrode 108 is formed on the inner wall of the upper portion of the housing 111 with a thickness of T1.

The signal line 109 has an L-shaped structure, and is formed on the side of the first main surface of the dielectric portion 101. One end of the signal line 109 is connected to the signal line 105. The other end of the signal line 109 is connected to the coil 133 of the magnetic field sensor 112. The coil 133 of the magnetic field sensor 112 is formed on the inner wall of the upper portion of the housing 111 as to be separated from the signal electrode 108 by a distance of D1.

As shown in FIG. 4, the signal line 134 is formed on the side of the first main surface of the dielectric portion 101. One end of the signal line 134 is connected to the other end of the coil 133 of the magnetic field sensor 112. The other end of the signal line 134 is connected to the reference potential electrode 102 through the terminal 113 and the via 132.

Figure 5:
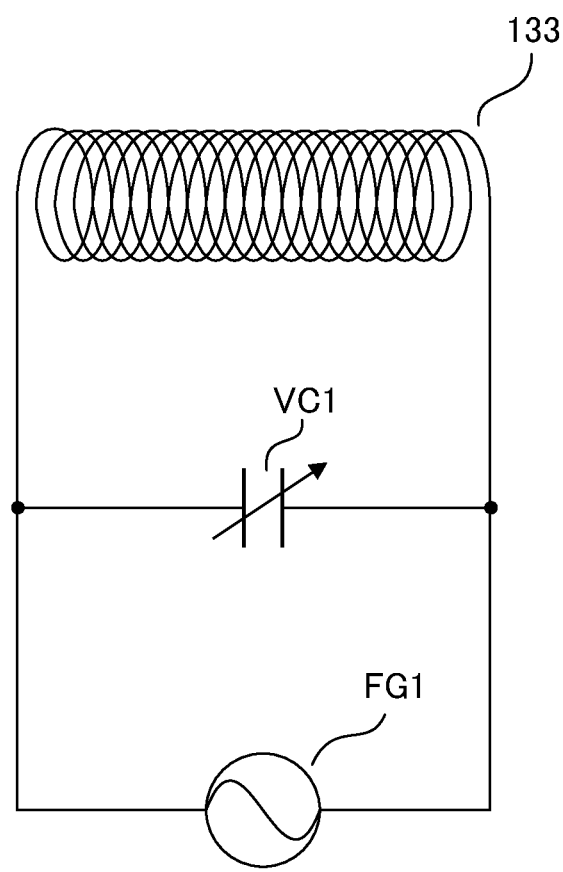
FIG. 5 is an equivalent circuit schematic of the communication apparatus according to the first embodiment.
Figure 6:
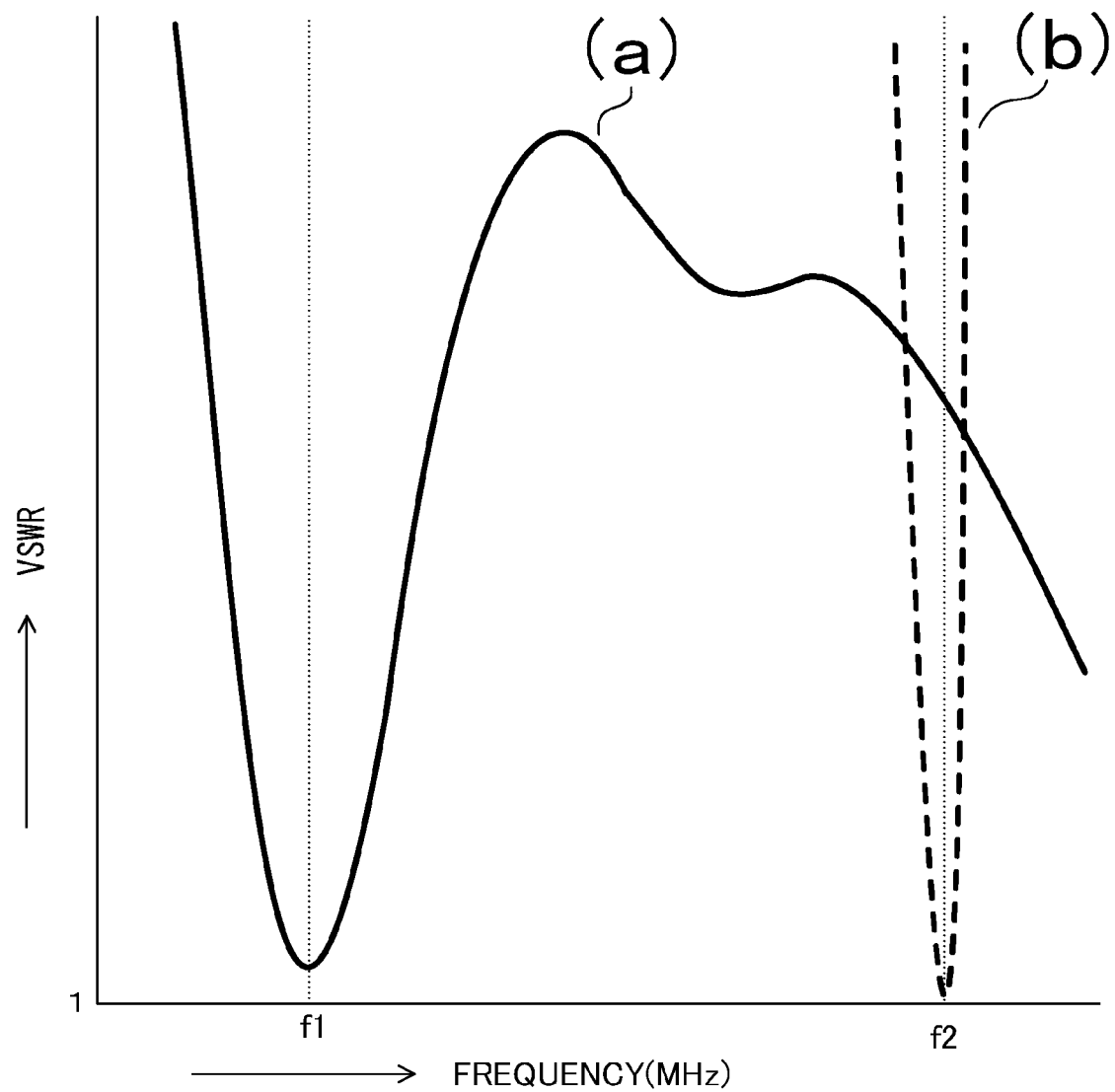
FIG. 6 is a view showing a VSWR (voltage standing wave ratio) characteristic of the communication apparatus according to the first embodiment.

Transmission and reception of the communication apparatus will be described with reference to FIGS. 5 and 6. FIG. 5 is an equivalent circuit schematic of the communication apparatus. FIG. 6 is a view showing a VSWR (voltage standing wave ratio) characteristic of the communication apparatus.

As shown in FIG. 5, when communication signals are transmitted from the communication unit 104, which is a signal generation source FG1, to the coil 133 of the magnetic field sensor 112 through the signal line 109, a current is generated in a spiral coil 133. The current generates a magnetic field along the core 110. When the living body 20 comes close the signal electrode 108, the signal electrode 108 generates a capacitive coupling. As a result, the signal electrode 108 and the reference potential electrode 102 form a capacitor. Furthermore, the capacitive coupling varies with a distance between the living body 20 and the signal electrode 108. A variable capacitor VC1 formed by the signal electrode 108 and the reference potential electrode 102 has capacitance that varies with the distance. The variable capacitor VC1 and the magnetic field sensor 112 are connected in parallel to each other, thereby, the variable capacitor VC1 functions as a frequency adjusting device.

As shown in FIG. 6, in the variable capacitor VC1 and the magnetic field sensor 112, when the living body 20 is separated from both the variable capacitor VC1 and the magnetic field sensor 112, an operating frequency of the magnetic field sensor 112 has a minimum value (as shown by the dotted line (b)) of the VSWR at a frequency of f2. The frequency f2 is not used in living body communication.

When the living body 20 comes close the variable capacitor VC1 and the magnetic field sensor 112, an operating frequency of the magnetic field sensor 112 has a minimum value (as shown by the solid line (a)) of the VSWR at a frequency of f1. The frequency f1 is set to a carrier frequency of the communication signals. For this reason, it is possible to generate magnetic fields with the frequency f1 on the surface of the living body 20. In addition, when the living body 20 comes close the variable capacitor VC1 and the magnetic field sensor 112, the length of the coil 133 is adjusted such that the operating frequency becomes equal to the carrier frequency.

Figure 7:
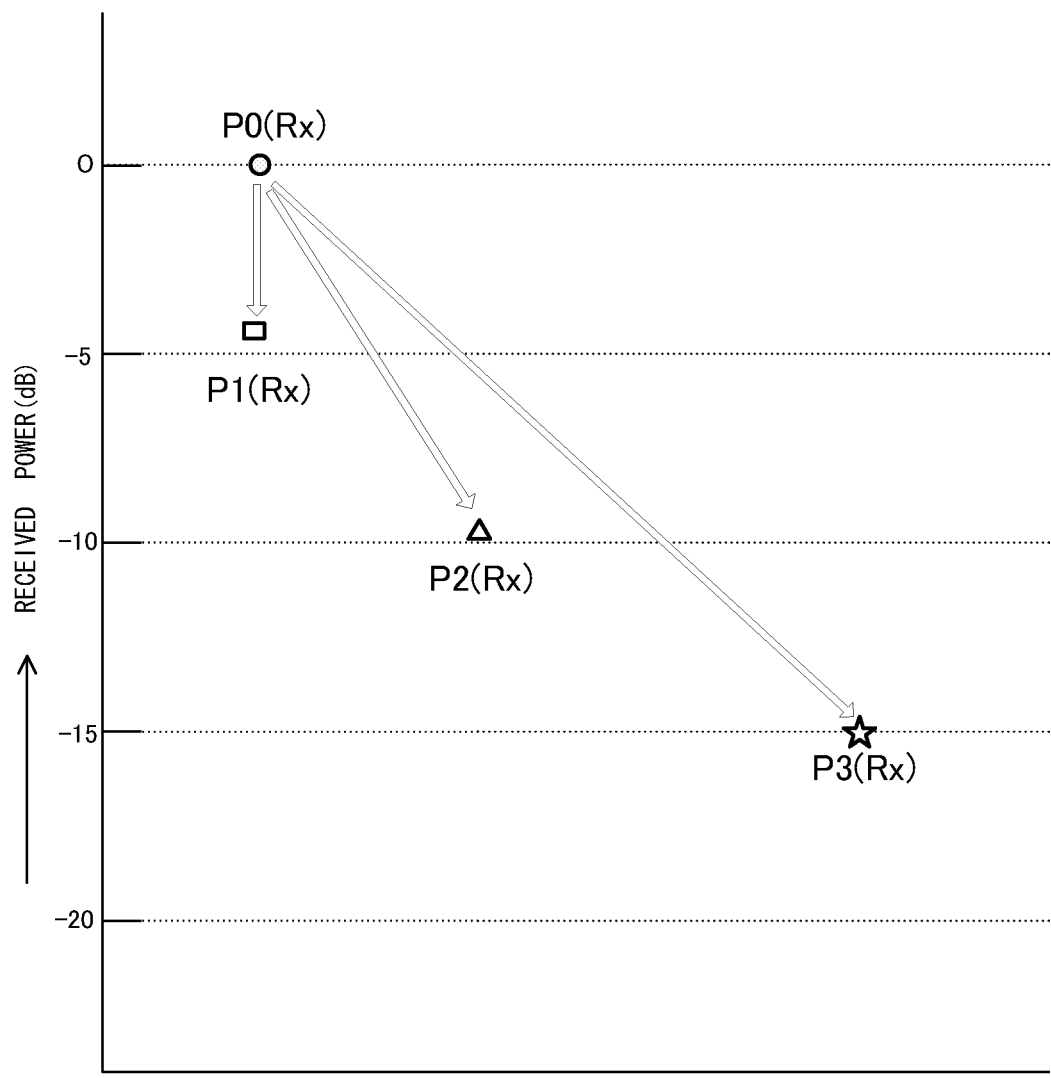
FIG. 7 is a view showing the received power of the communication apparatus according to the first embodiment.
Figure 8:
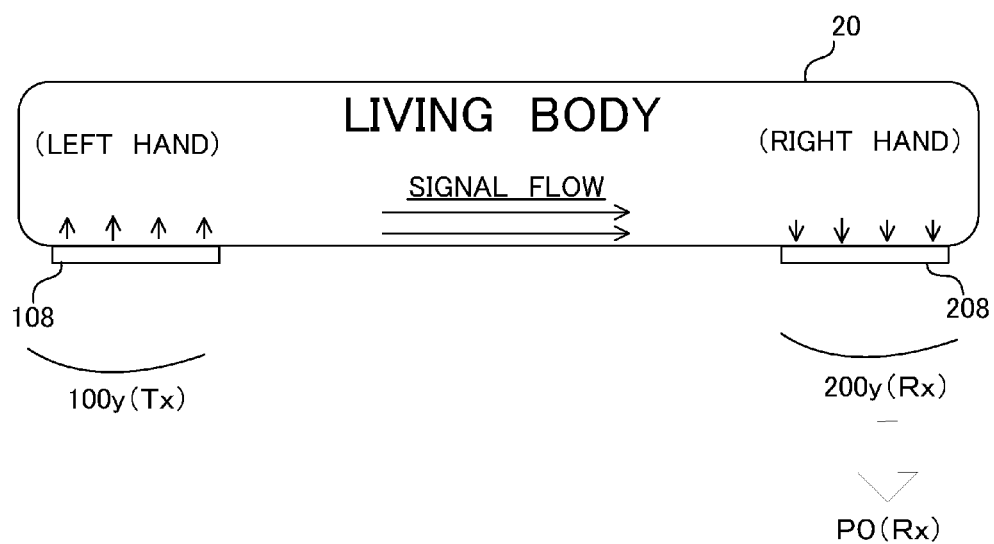
FIG. 8 is a view showing a signal flow in the communication apparatus of the first embodiment when a signal electrode of the communication apparatus is directly in contact with a living body.
Figure 9:
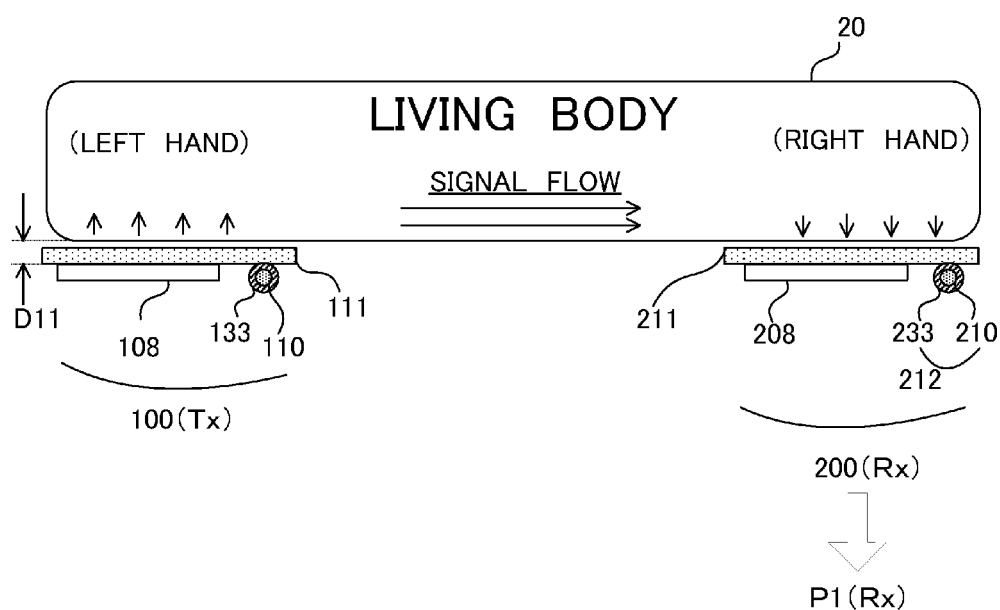
FIG. 9 is a view showing a signal flow in the communication apparatus of the first embodiment when the signal electrode approaches the living body.
Figure 10:
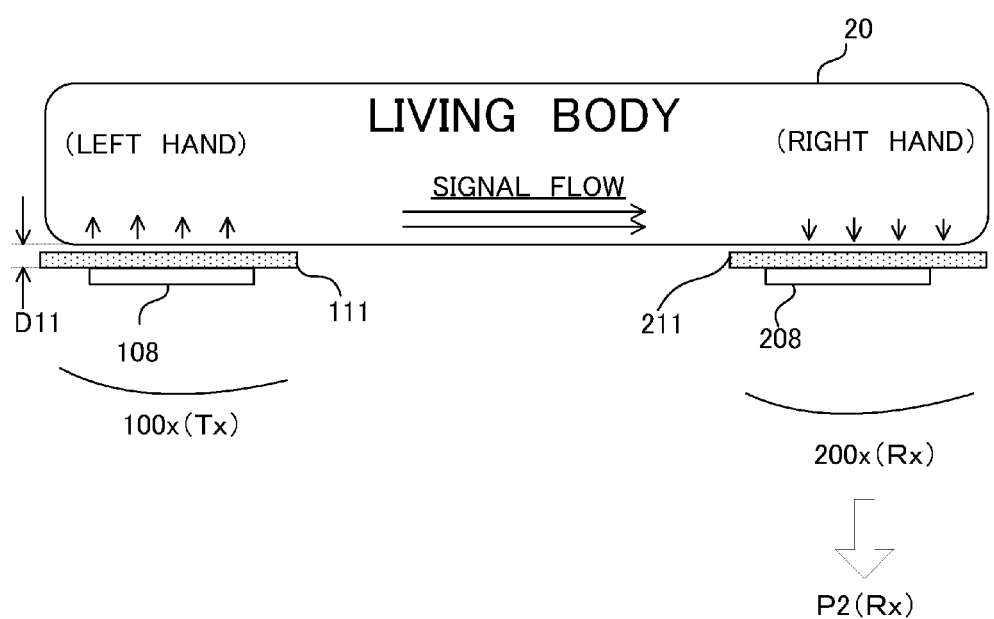
FIG. 10 is a view showing a signal flow in the communication apparatus of a first comparative example when the signal electrode of the apparatus approaches the living body.
Figure 11:
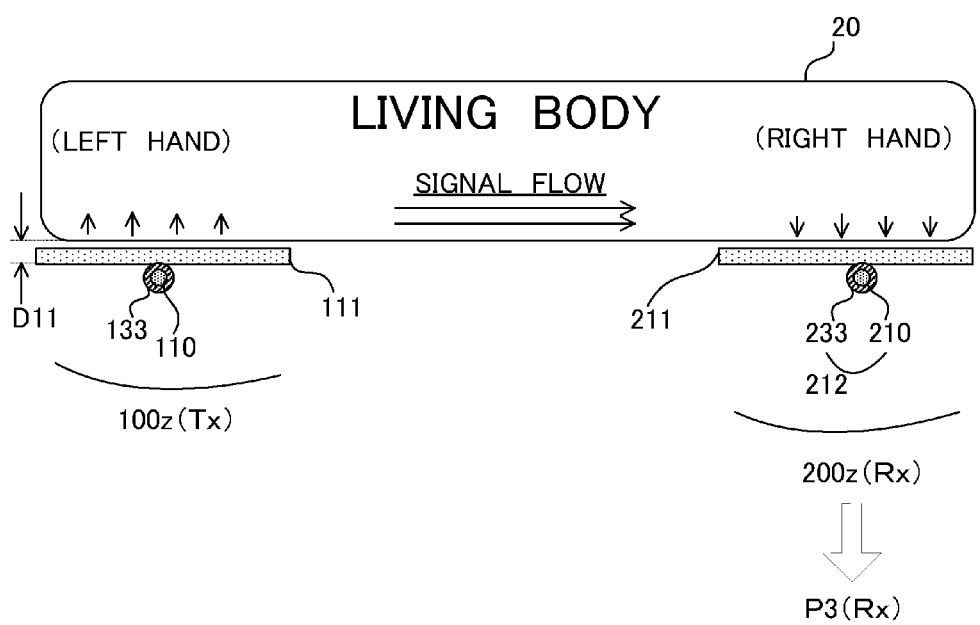
FIG. 11 is a view showing a signal flow in the communication apparatus of a second comparative example when the signal electrode of the apparatus approaches the living body.

Received power of the communication apparatus will be described with reference to FIGS. 7 to 11. FIG. 7 is a view showing the received power of the communication apparatus. FIG. 8 is a view showing a signal flow when the signal electrode of the communication apparatus is directly in contact with a living body. FIG. 9 is a view showing a signal flow in the communication apparatus of the embodiment when the signal electrode comes close the living body. FIG. 10 is a view showing a signal flow in the communication apparatus of a first comparative example when the signal electrode comes close the living body. FIG. 11 is a view showing a signal flow in the communication apparatus of a second comparative example when the signal electrode comes close the living body.

FIG. 7 shows a comparison between the received power P0 (Rx), the received power P1 (Rx), the received power P2 (Rx), and the received power P3 (Rx). The comparison shows variations in ratios of the received power P1 (Rx), the received power P2 (Rx), and the received power P3 (Rx) to the received power P0 (Rx) as a reference value (0 dB) for the embodiment, the first comparative example, and the second comparative example, respectively.

As shown in FIG. 8, the received power P0 (Rx) is a received power of the communication system when the signal electrode 108 of the communication apparatus 100y is directly in contact with the left hand of the living body 20, and when the signal electrode 208 of the communication apparatus 200y is directly in contact with the right hand of the living body 20, and when data is transmitted from the communication apparatus 100y to the communication apparatus 200y through the living body 20.

As shown in FIG. 9, the received power P1 (Rx) is a received power of the communication system 1 when the signal electrode 108 of the communication apparatus 100 and the coil 133 of the magnetic field sensor 112 of the embodiment are separated from the living body 20 only by a distance of D11, and when the signal electrode 208 of the communication apparatus 200 and the coil 233 of the magnetic field sensor 212 of the embodiment are separated from the living body 20 only by a distance of D11 through the living body 20, and when data is transmitted from the communication apparatus 100 to the communication apparatus 200 through the living body 20. The distance D11 is set to 5 mm that is thicker than the thickness T1 of the housing 111.

As shown in FIG. 10, the received power P2 (Rx) is a received power of the communication system of the first comparative example when the signal electrode 108 of the communication apparatus 100x of the first comparative example is separated from the living body 20 by a distance of D11, and when the signal electrode 208 of the communication apparatus 200x of the first comparative example is separated from the living body 20 by a distance of D11, and when data is transmitted from the communication apparatus 100x to the communication apparatus 200x through the living body 20. The first comparative example lacks a magnetic field sensor.

As shown in FIG. 11, the received power P3 (Rx) is a received power of the communication system of the second comparative example when the coil 133 of the magnetic field sensor 112 of the communication apparatus 100z of the second comparative example is separated from the living body 20 only by a distance of D11, and the coil 233 of the magnetic field sensor 212 of the communication apparatus 200z of the second comparative example is separated from the living body 20 only by a distance of D11, and data is transmitted from the communication apparatus 100z to the communication apparatus 200z through the living body 20. The second comparative example lacks a signal electrode.

As shown in FIG. 7, in the communication system of the first comparative example, when the signal electrode and the living body 20 are in contact with each other, the capacitive coupling has a maximum value and the transmitted and received power has a maximum value. As it is, because the signal electrode and the living body 20 are separated from each other by a distance of D11, the received power P2 (Rx) has −9.9 dB. Thereby, the received power P2 (Rx) reduces substantially in comparison with the received power P0 (Rx).

In the communication system of the second comparative example, the operating frequency of the magnetic field sensor is set to a frequency different from the communication frequency f1. For this reason, when the signal electrode and the living body 20 is set to separate from each other by a distance of D11, the received power P3 (Rx) has −15 dB. Thereby, the received power P3 (Rx) reduces substantially in comparison with the received power P0 (Rx).

Meanwhile, in the communication system 1 of the embodiment, the signal electrode 108 and the magnetic field sensor 112 are provided to the communication apparatus 100. The signal electrode 208 and the magnetic field sensor 212 are provided to the communication apparatus 200. When the signal electrode and the magnetic field sensor are separated from each other by a distance of D11, the operating frequency of the magnetic field sensor is set to the communication frequency. As a result, the received power P1 (Rx) is reduced only by −4.7 dB in comparison with the received power P0 (Rx). This result corresponds to enhancement of 5.2 dB in the received power in comparison with the communication system of the first comparative example. Therefore, in the communication system 1 of the embodiment, it is possible to improve the receiving sensitivity when the signal electrode and the magnetic field sensor are separated from each other by a distance of D11.

In addition, in the communication system 1, it is possible to improve the receiving sensitivity when the living body 20 is directly in contact with the outer surface of the housing 111 including the signal electrode.

A communication system, which employs capacitive coupling, commonly requires large areas of signal electrodes. By contrast, in the communication system 1 of the embodiment achieves, it is possible to shrink an area of the signal electrode. Separating the signal electrode from the magnetic field sensor by a distance of D11 allows a form of the signal electrode to be not only a plate but also a rectangular parallelepiped, an oval sphere, or the like. The housing 111 can have several forms other than a box form in accordance with the form of the signal electrode. The embodiment is capable of responding to various carrier frequencies by changing capacitance of the variable capacitor VC1 (see FIG. 5).

An operator commonly needs to manually adjust the frequency of a bar antenna as a magnetic field sensor, by using a control circuit. A usage state of the magnetic field sensor needs to be monitored by some means, and the control circuit is required to automatically adjust the magnetic field sensor based on the monitored usage state. Adjusting a magnetic field sensor automatically in living body communication previously has needed a sensor for determining a distance between the magnetic sensor and a living body, and a control circuit for controlling a frequency of the added sensor based on the distance determined.

By contrast, the communication system 1 of the embodiment includes the variable capacitor VC1 and the coil of the magnetic field sensor, both being connected in parallel to each other, in order to automatically change the variable capacitor VC1 in response to a distance between the living body 20 and the signal electrode, thereby controlling the frequency. As a result, the communication system 1 of the embodiment eliminates the need for the control circuit and the sensor. Therefore, it is possible to reduce substantially a circuit size or power consumption.

As mentioned above, the communication apparatus 100 of the embodiment includes the substrate 103, the communication unit 104, the signal line 105, the terminal 106, the signal line 107, the signal electrode 108, the signal line 109, the housing 111, the magnetic field sensor 112, the terminal 113, the via 131, the via 132, and the signal line 134. Data communications are performed when the living body 20 comes close the signal electrode 108 and the magnetic field sensor 112 in the communication apparatus 100, and when the living body 20 comes close the signal electrode 208 and a magnetic field sensor in the communication apparatus 200. A capacitor formed by the living body 20 and the signal electrode 108 is a variable capacitor VC1 with capacitance that varies with a distance between the living body 20 and the signal electrode 108. The variable capacitor VC1 and the magnetic field sensor 112 are connected in parallel, thereby enabling the variable capacitor VC1 to serve as a frequency adjusting device. When the living body 20 comes close the variable capacitor VC1 and the magnetic field sensor, the operating frequency of the magnetic field sensor is set to the carrier frequency of communication signals.

For this reason, when the living body 20 comes close, it is possible to improve the receiving sensitivity of the communication apparatus. It is possible to improve the receiving sensitivity without direct contact with the living body 20. Therefore, it is enable to form a various shape of the signal electrode or the housing 111

Figure 12:
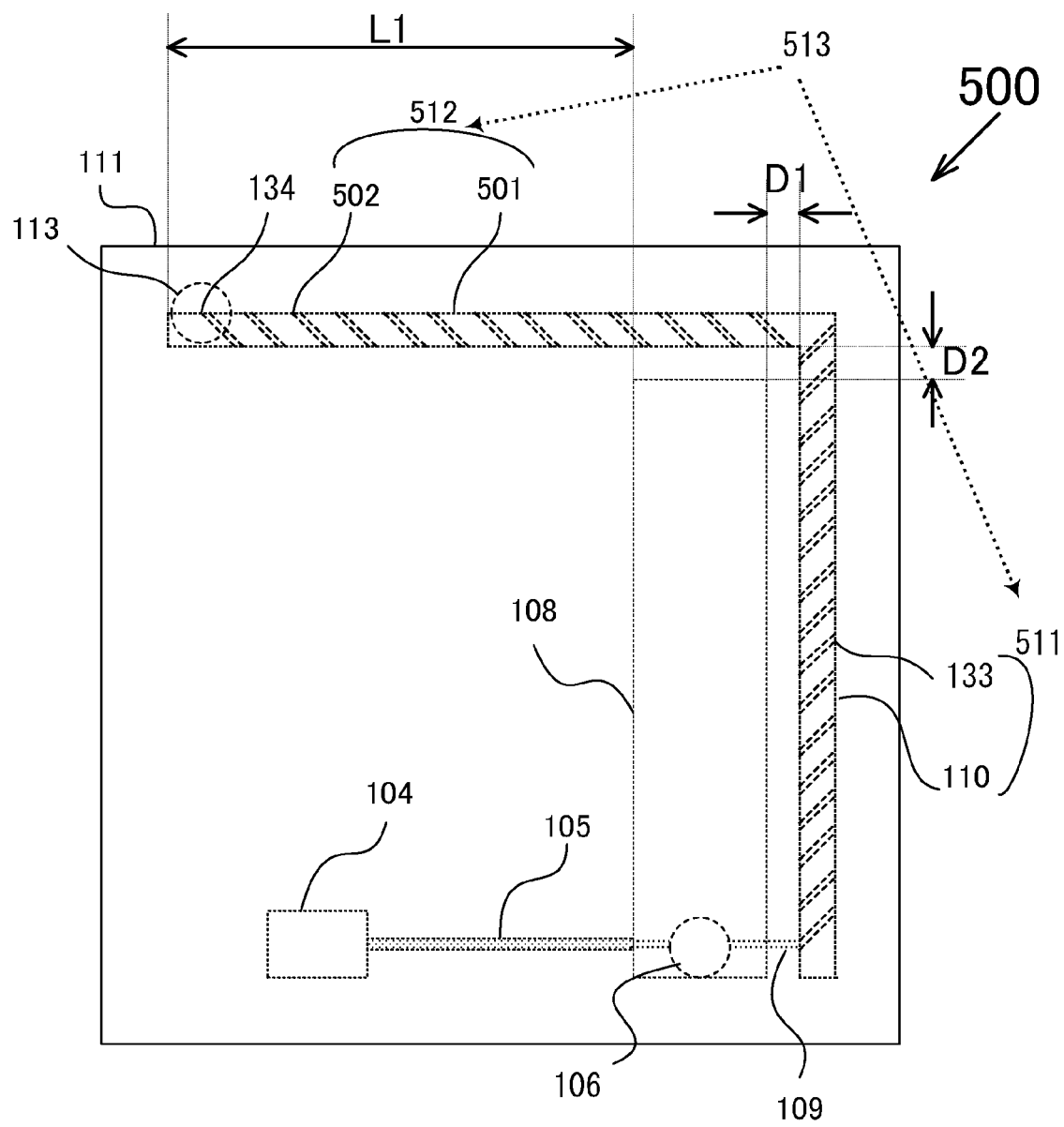
FIG. 12 is a view showing a configuration of a communication apparatus according to a first modification.

The magnetic field sensor 112 and the signal electrode 108 have been configured to face each other and be separated from each other by a predetermined distance in the embodiment. The configuration of the embodiment is not limited to this case. FIG. 12 is a view showing a configuration of a communication apparatus according to a first modification. For example, the configuration of the magnetic field sensor may be changed in the same way as in the communication apparatus 500 of the first modification shown in FIG. 12.

Specifically, the magnetic field sensor 513 includes a first configuration portion 511 and a second configuration portion 512. The first configuration portion 511 is separated from a first side of the signal electrode 108 only by a distance of D1. The first configuration portion 511 further includes the core 110 and the coil 133 wound around the core 110. The second configuration portion 512 is separated from a second side of the signal electrode 108 only by a distance of D2. The second side is adjacent to the first side. The second configuration portion 512 further includes a core 501 and a coil 502 wound around the core 501. One end of the coil 133 of the first configuration portion 511 is connected to the other end of the signal line 109. The other end of the coil 133 is connected to one end of the coil 502 of the second configuration portion 512. The other end of the coil 502 of the second configuration portion 512 is connected to one end of a signal line 134. The other end of the signal line 134 is connected to the reference electrode 102 through the terminal 113 and the via 132. The second configuration portion 512 extends further from the signal electrode 108 by a distance of L1.

The communication apparatus 500 of the first modification is capable of generating and receiving a bidirectional magnetic field, thereby, it is possible to provide diversity effect.

Alternatively, the magnetic field sensor may include the first configuration portion 511, the second configuration portion 512, and a third configuration portion (not shown). Specifically, the third configuration portion is separated from a third side of the signal electrode 108 only by a predetermined distance. The third side faces the first side. The third configuration portion includes a core and a coil wound around the core. One end of the coil of the third configuration portion is connected to the other end of the coil 502; and the other end of the coil is connected to the reference potential electrode 102 through the signal line 134, the terminal 113, and the via 132.

The communication apparatus further including the third configuration portion is capable of generating and receiving a three-directional magnetic field, thereby, it is possible to provide diversity effect.

Alternatively, the magnetic field sensor may include the first configuration portion 511, the second configuration portion 512, a third configuration portion (not shown), and a fourth configuration portion (not shown).

Specifically, the third configuration portion is separated from a third side of the signal electrode 108 only by a predetermined distance. The third side faces the first side. The third configuration portion includes a core and a coil wound around the core. The fourth configuration portion is separated from a fourth side of the signal electrode 108 only by a predetermined distance. The fourth side is opposite to the second side. The fourth configuration portion includes a core and a coil wound around the core. One end of the coil of the third configuration portion is connected to the other end of the coil 502. The other end of the coil is connected to one end of the coil of the fourth configuration portion. The other end of the coil of the fourth configuration portion is connected to the reference potential electrode 102 through the signal line 134, the terminal 113, and the via 132. The third configuration portion generates a magnetic field with the same direction as that of the magnetic field that the first configuration portion 511 generates. The fourth configuration portion generates a magnetic field with the same direction as that of the magnetic field that the second configuration portion 512 generates.

Figure 13:
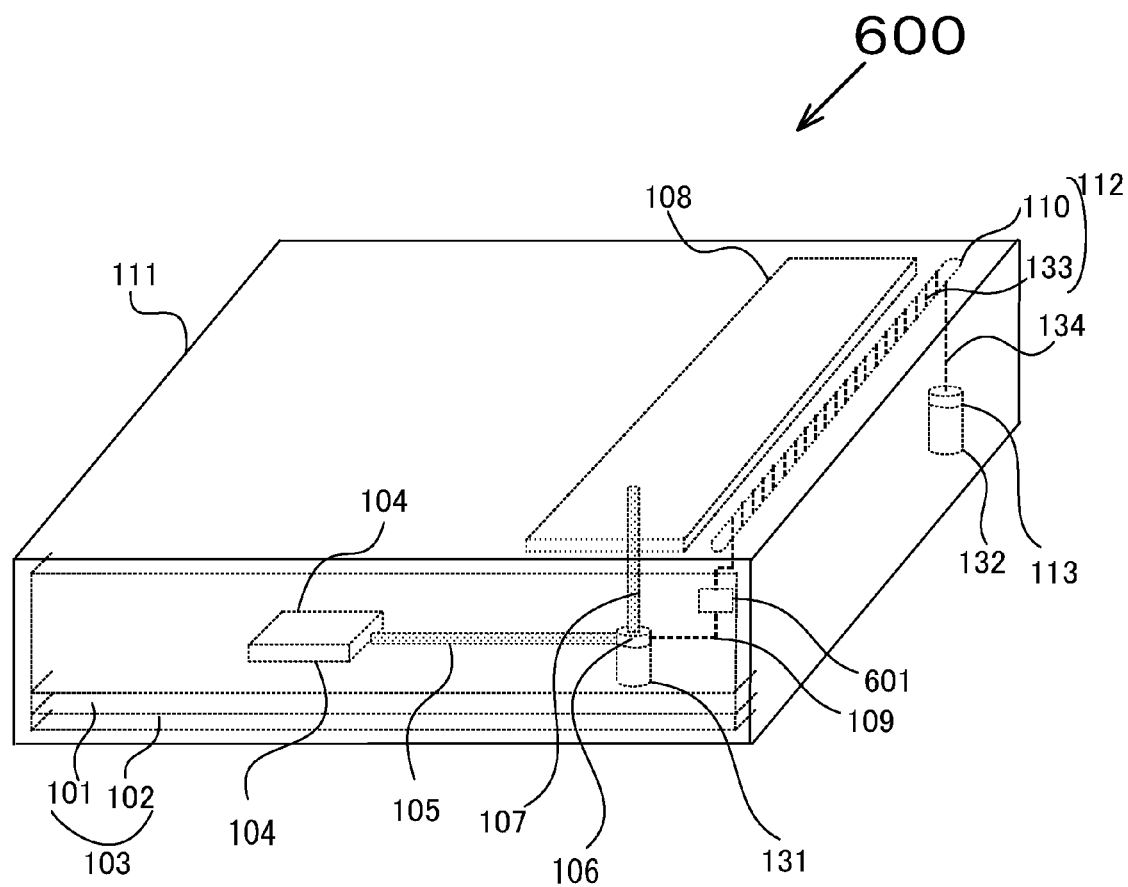
FIG. 13 is a view showing a configuration of a communication apparatus according to a second embodiment.
Figure 14:
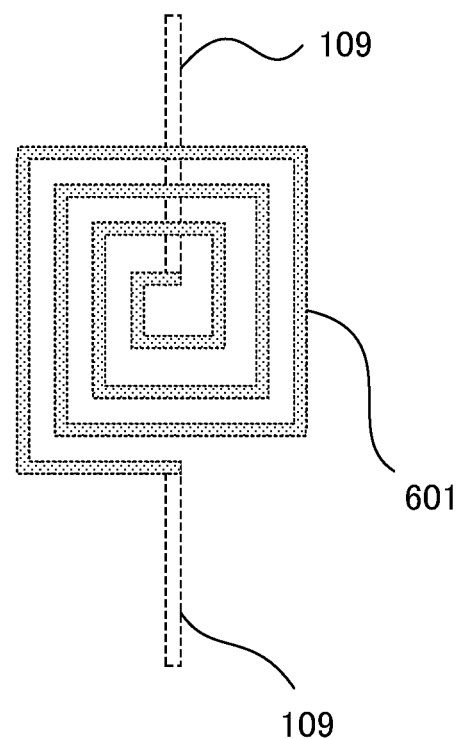
FIG. 14 is a top view showing an inductor according to the second embodiment.

A communication apparatus according to a second embodiment will be described with reference to the drawings. FIG. 13 is a view showing a configuration of a communication apparatus. FIG. 14 is a top view showing an inductor. The embodiment is configured to have an inductor between the signal line 109 and the magnetic field sensor 112, thereby, the value of the inductance increases.

Hereinafter, the same constituent portions as those of the first embodiment are indicated by the same reference numerals and description of the portions will be omitted, and different portions alone will be described.

As shown in FIG. 13, a communication apparatus 600 includes the substrate 103, the communication unit 104, the signal line 105, the terminal 106, the signal line 107, the signal electrode 108, the signal line 109, the housing 111, the magnetic field sensor 112, the terminal 113, the via 131, the via 132, the signal line 134, and an inductor 601. The inductor 601 is formed between the signal line 109 and the coil 133 of the magnetic field sensor 112.

When the housing 111 for the communication apparatus 600 is comparatively small in size, and when the core 110 of the magnetic field sensor 112 has a length limit, it may not be possible to get an inductance value in accordance with a desired frequency needed for the magnetic field sensor 112. The inductor 601 refills the inductance value corresponding to the needed frequency.

As shown in FIG. 14, the inductor 601 is a spiral inductor formed, for example, on a dielectric layer (not shown). A spiral inductor is used for the inductor 601 in the embodiment. Alternatively, the inductor 601 may be a stacked-shape inductor with a high Q-value.

As mentioned above, the communication apparatus 600 of the embodiment includes the substrate 103, the communication unit 104, the signal line 105, the terminal 106, the signal line 107, the signal electrode 108, the signal line 109, the housing 111, the magnetic field sensor 112, the terminal 113, the via 131, the via 132, the signal line 134, and the inductor 601. The inductor 601 is formed between the signal line 109 and the magnetic field sensor 112.

For this reason, when the housing 111 is comparatively small in size, it is possible to refill the inductance value corresponding to the needed frequency by the inductor 601. Therefore, the communication apparatus 600 has the enhanced receiving sensitivity to be capable of communicating at a desired frequency in case that the core of the magnetic field sensor 110 has a length limit.

Figure 15:
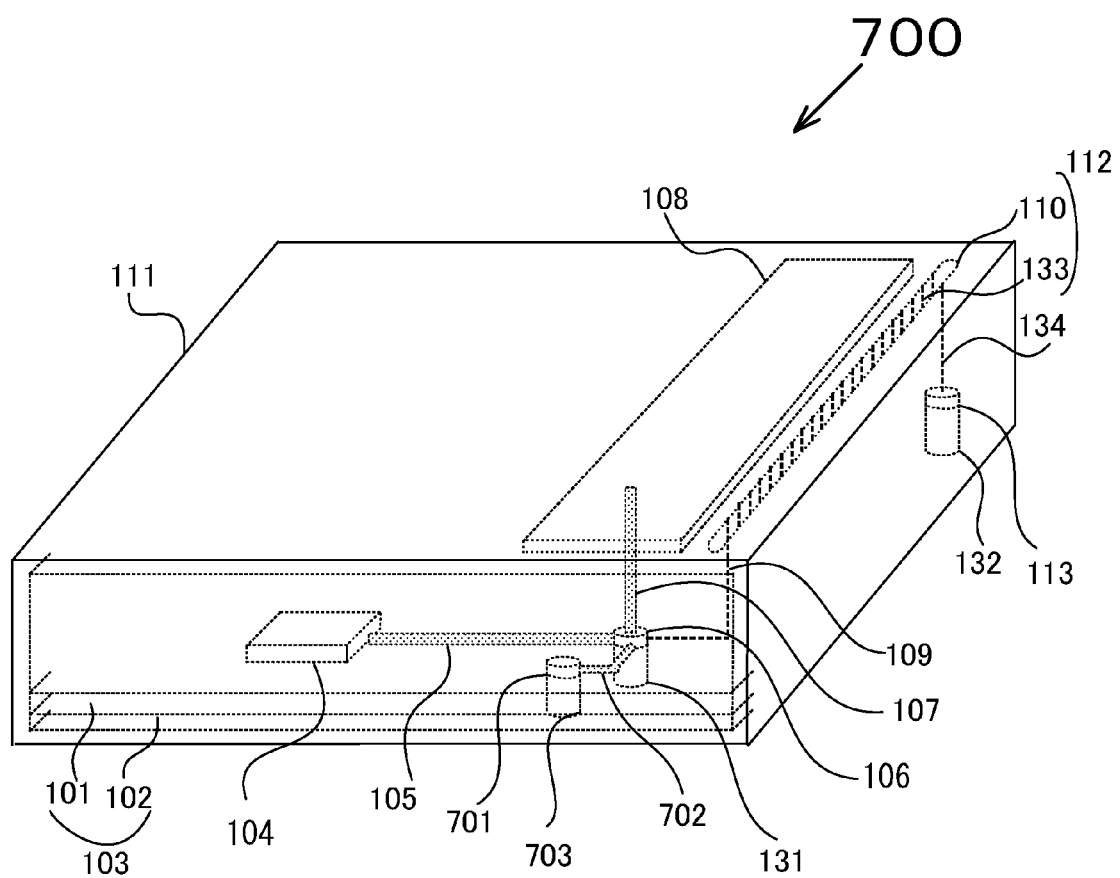
FIG. 15 is a view showing a configuration of a communication apparatus according to a third embodiment.

A communication apparatus according to a third embodiment will be described with reference to the drawings. FIG. 15 is a view showing a configuration of the communication apparatus. The communication apparatus is configured to have a capacitor between the terminal 106 and the reference potential electrode 102. The capacitor refills a value of capacitance.

Hereinafter, the same constituent portions as those of the first embodiment are indicated by the same reference numerals and description of the portions will be omitted, and different portions alone will be described.

As shown in FIG. 15, a communication apparatus 700 includes the substrate 103, the communication unit 104, the signal line 105, the terminal 106, the signal line 107, the signal electrode 108, the signal line 109, the housing 111, the magnetic field sensor 112, the terminal 113, the via 131, the via 132, the signal line 134, a capacitor 701, a signal line 702, and a via 703.

The signal line 702 is formed on the first main surface of the dielectric portion 101. One end of the signal line 702 is connected to the terminal 106. The terminal 106 is connected to the signal line 105 and the signal line 109. The other end of the signal line 702 is connected to one end of the capacitor 701. The other end of the capacitor 701 is connected to the reference potential electrode 102 through the via 703.

The housing 111 for the communication apparatus 600 is comparatively small in size. When the signal electrode 108 has a dimensional limit, it may not be possible to get a capacitance value in accordance with a desired frequency needed for the magnetic field sensor 112. The capacitor 701 refills a value of capacity corresponding to the desired frequency.

As mentioned above, the communication apparatus of the embodiment includes the substrate 103, the communication unit 104, the signal line 105, the terminal 106, the signal line 107, the signal electrode 108, the signal line 109, the housing 111, the magnetic field sensor 112, the terminal 113, the via 131, the via 132, the signal line 134, the capacitor 701, the signal line 702, and the via 703. One end of the capacitor 701 is connected to the terminal 106 through the signal line 702. The other end of the capacitor 701 is connected to the reference potential electrode 102 through the via 703.

For this reason, when the housing 111 for the communication apparatus 600 is comparatively small in size, and when the core 110 of the magnetic field sensor 112 has a length limit, it is possible to refill a desired value of capacitance by the capacitor 701. Therefore, the communication apparatus 700 has the enhanced receiving sensitivity to be capable of communicating at a desired frequency in case that the signal electrode 108 has a dimensional limit.

Figure 16:
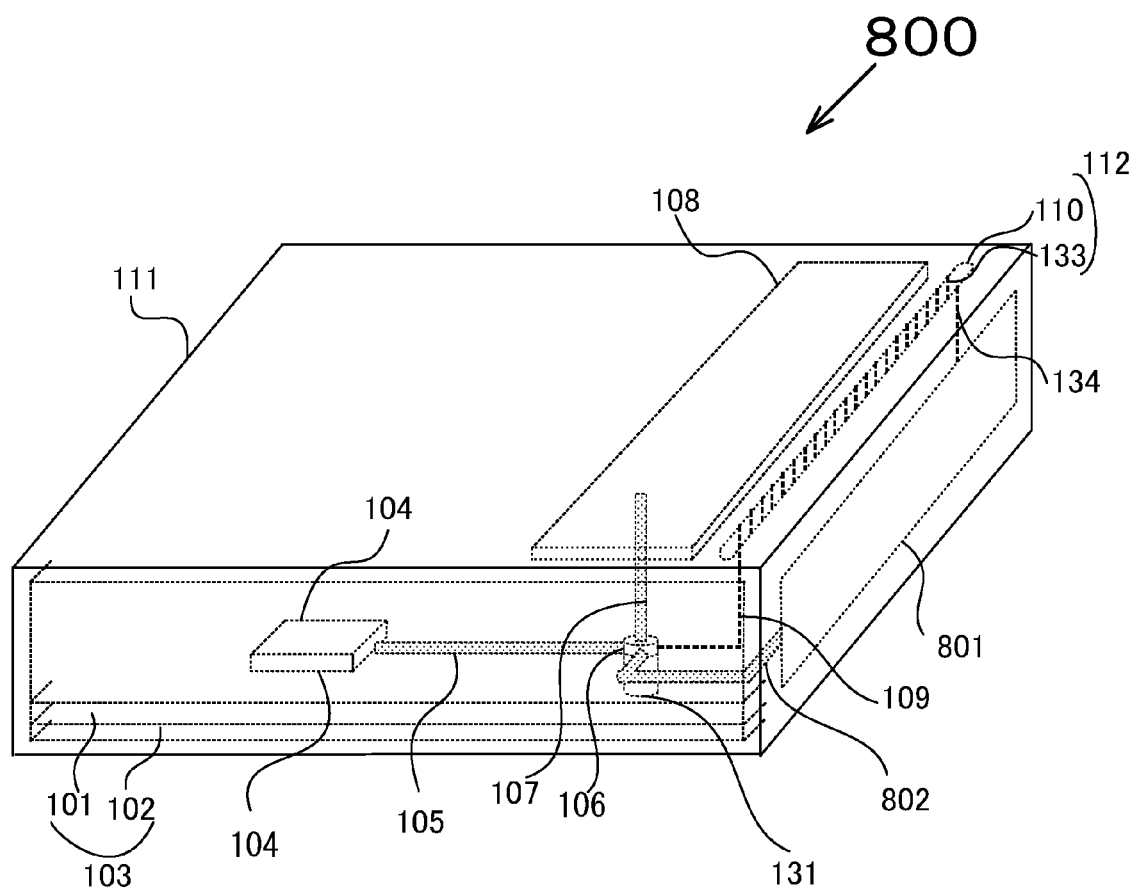
FIG. 16 is a view showing a configuration of a communication apparatus according to a fourth embodiment.

A communication apparatus according to a fourth embodiment will be described with reference to the drawings. FIG. 16 is a view showing a configuration of the communication apparatus. The embodiment is provided with a second signal electrode to substantially ease restrictions on positions that a user may come close or be in contact with.

Hereinafter, the same constituent portions as those of the first embodiment are indicated by the same reference numerals and description of the portions will be omitted, and different portions alone will be described.

As shown in FIG. 16, a communication apparatus 800 includes the substrate 103, the communication unit 104, the signal line 105, the terminal 106, the signal line 107, the signal electrode 108, the signal line 109, the housing 111, the magnetic field sensor 112, the terminal 113, the via 131, the via 132, the signal line 134, a signal electrode 801, and a signal line 802.

The signal line 802 is provided on the side of a first main surface of the dielectric portion 101. One end of the signal line 802 is connected to the terminal 106, and the other end of the signal line 802 is connected to the signal electrode 801.

The signal electrode 801 is plate-like in form, and arranged inside the right side (on the inner wall) of the housing 111. The signal electrode 801 tilts 90 degrees with respect to both the signal electrode 108 and the magnetic field sensor 112, which are formed on the inner wall of the housing 111. The signal electrode 801 is separated from the magnetic field sensor 112 only by a predetermined distance. The signal electrode 801 is separated from the signal electrode 108 through the magnetic field sensor 112 only by a predetermined distance. Transparent materials are used for the signal electrode 801. The materials include a conductive sheet of copper foil, a thin film of conductive ink that is prepared by ink-jet printing and sintering, and ITO (indium tin oxide).

In the communication apparatus 800, when the living body comes close or is in contact with the right side of the housing 111 with the signal electrode 801, it is possible to generate and receive a magnetic field on the surface of the living body 20 by the magnetic field sensor 112. Therefore, it is possible to reduce restrictions on positions that a user comes close.

As mentioned above, the communication apparatus of the embodiment includes the substrate 103, the communication unit 104, the signal line 105, the terminal 106, the signal line 107, the signal electrode 108, the signal line 109, the housing 111, the magnetic field sensor 112, the terminal 113, the via 131, the via 132, the signal line 134, the signal electrode 801, and the signal line 802. The signal electrode 801 is arranged inside (inner wall) the right-hand side of the housing 111. The signal electrode 801 is separated by a predetermined distance from the magnetic field sensor 112 and the signal electrode 108, both being on the inside surface (inner wall) of the housing 111.

For this reason, when the living body 20 comes close or is in contact with the signal electrode 801, it is possible to communicate at a desired frequency, and to improve the receiving sensitivity of the communication apparatus 800. Therefore, the communication apparatus 800 enables it to substantially ease restrictions on positions that a user can come close or be in contact with.

The embodiment employs a bar antenna for the magnetic sensor. Alternatively, when a carrier frequency of communication signals is different, an antenna instead of the bar antenna may be used. For example, when the carrier frequency of communication signals is not less than hundreds of MHz, a monopole antenna and a meander line antenna, or the like may be appropriately used.

Moreover, the embodiments are employed for short-distance communication through the living body 20, but not limited to this case. The embodiments may be used for medical treatment/health care, in-vehicle radio, entertainment, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus to communicate through a living body, comprising:
   a substrate including a reference potential electrode;
   a communication unit formed on a first main surface of the substrate;
   a first signal line formed on the first main surface, one end of the first signal line to be connected to the communication unit;
   a terminal formed on the first main surface and to be connected to the other end of the first signal line;
   a second signal line formed on a side of the first main surface, one end of the second signal line to be connected to the terminal, the second signal line to be connected to the first signal line through the terminal;
   a first signal electrode formed on a side of the first main surface, the first signal electrode to be connected to the other end of the second signal line;
   a third signal line formed on a side of the first main surface, one end of the third signal line to be connected to the terminal, the third signal line to be connected to the first signal line through the terminal;
   a magnetic field sensor formed on the first main surface, one end of the magnetic field sensor to be connected to the other end of the third signal line, the other end of the magnetic field sensor to be connected to the reference potential electrode; and
   a housing to cover and store the substrate, the communication unit, the first signal line, the terminal, the second signal line, the first signal electrode, the third signal line, and the magnetic field sensor.

2. The communication apparatus according to claim 1, wherein
   the magnetic field sensor generates a magnetic field on a surface of the living body during propagation of signals,
   variable capacitance varies with a distance between the first signal electrode and the living body serves as a frequency adjusting device, and
   an operating frequency of the magnetic field sensor becomes equal to a carrier frequency of data communications performed when the living body comes close the communication apparatus.

3. The communication apparatus according to claim 1, wherein
   the magnetic field sensor faces the first signal electrode, and is separated from the first signal electrode by a predetermined distance.

4. The communication apparatus according to claim 1, wherein
   the magnetic field sensor faces a first side of the first signal electrode, and is separated from the first signal electrode by a first predetermined distance.

5. The communication apparatus according to claim 1, wherein
   the magnetic field sensor faces a first side of the first signal electrode and a second side of the first signal electrode, the second side being adjacent to the first side,
   the magnetic field sensor is separated from a first predetermined distance on a side of the first side, and
   the magnetic field sensor is separated from a second predetermined distance on a side of the second side.

6. The communication apparatus according to claim 1, wherein
   the magnetic field sensor faces a first side of the first signal electrode, a second side of the first signal electrode, and a third side of the first signal electrode, the second side being adjacent to the first side, the third side facing the first side, and
   the magnetic field sensor is separated from the first side, the second side, and the third side by a first distance, a second distance, and a third distance, respectively.

7. The communication apparatus according to claim 1, wherein
   the magnetic field sensor faces a first side of the first signal electrode, a second side of the first signal electrode, and a third side of the first signal electrode, and a fourth side of the first signal electrode, the second side being adjacent to the first side, the third side facing the first side, the fourth side facing the second side, and
   the magnetic field sensor is separated from the first side, the second side, the third side, and the fourth side by a first distance, a second distance, a third distance, and a fourth distance, respectively.

8. The communication apparatus according to claim 7, wherein magnetic fields generated by the magnetic field sensor have the same directions on the first side and the third side, and magnetic fields generated by the magnetic field sensor have the same directions on the second side and the fourth side.

9. The communication apparatus according to claim 1, wherein the magnetic field sensor is configured to have a core and a coil wound around the core as a bar antenna.

10. The communication apparatus according to claim 9, wherein the core includes ferrite.

11. The communication apparatus according to claim 1, wherein the first signal electrode includes a conductive sheet, conductive ink, or a transparent electrode material.

12. The communication apparatus according to claim 1, wherein a form of the housing is a box or an oval sphere.

13. The communication apparatus according to claim 1, further comprising:

an inductor provided on a side of a first main surface of the substrate, one end of the inductor to be connected to the other end of the third signal line, the other end of the inductor to be connected to one end of the magnetic sensor.

14. The communication apparatus according to claim 13, wherein the inductor is a spiral inductor or a stacked-shape inductor.

15. The communication apparatus according to claim 1, further comprising:

a capacitor formed on a first main surface of the substrate, one end of the capacitor to be connected to the terminal, the other end of the capacitor to be connected to the reference potential electrode.

16. The communication apparatus according to claim 1, further comprising:

a fourth signal line formed on a first main surface of the substrate, one end of the fourth signal line to be connected to the terminal; and a second signal electrode formed on a first main surface of the substrate, the second signal electrode to be connected to the other end of the fourth signal line, the second signal electrode facing the first signal electrode through the magnetic field sensor, the second signal electrode to be separated from the first signal electrode by a predetermined distance.

17. The communication apparatus according to claim 16, wherein the second signal electrode includes a conductive sheet, conductive ink, or a transparent electrode material.

18. The communication apparatus according to claim 1, wherein the magnetic field sensor is a monopole antenna or a meander line antenna.

* * * * *